No. 748,728. PATENTED JAN. 5, 1904.
E. E. HARTER & E. O. DOAK.
MARKER LIFTER FOR CORN PLANTERS.
APPLICATION FILED OCT. 1, 1903.
NO MODEL.

Witnesses:
L. L. Leibrock.
R. H. Orwig.

Inventors: Eli E. Harter,
and Egbert O. Doak.
By Thomas G. Orwig, Attorney.

THE NORRIS PETERS CO., PHOTO-LITHO., WASHINGTON, D. C.

No. 748,728. Patented January 5, 1904.

UNITED STATES PATENT OFFICE.

ELI E. HARTER AND EGBERT O. DOAK, OF SAC CITY, IOWA.

MARKER-LIFTER FOR CORN-PLANTERS.

SPECIFICATION forming part of Letters Patent No. 748,728, dated January 5, 1904.

Application filed October 1, 1903. Serial No. 175,397. (No model.)

*To all whom it may concern:*

Be it known that we, ELI E. HARTER and EGBERT O. DOAK, citizens of the United States, residing at Sac City, in the county of Sac and State of Iowa, have invented a new and useful Marker-Lifter for Corn-Planters, of which the following is a specification.

Our object is to provide simple, strong, and durable attachments for corn-planters specially adapted for lifting and carrying inoperative a marker at the same time that the runners are elevated, as required in turning about at the ends of a field.

Our invention consists in the construction, arrangement, and combination of rock-shafts with a marker and mechanism for lifting the runners, as hereinafter set forth, pointed out in our claims, and illustrated in the accompanying drawings, in which—

Figure 1:
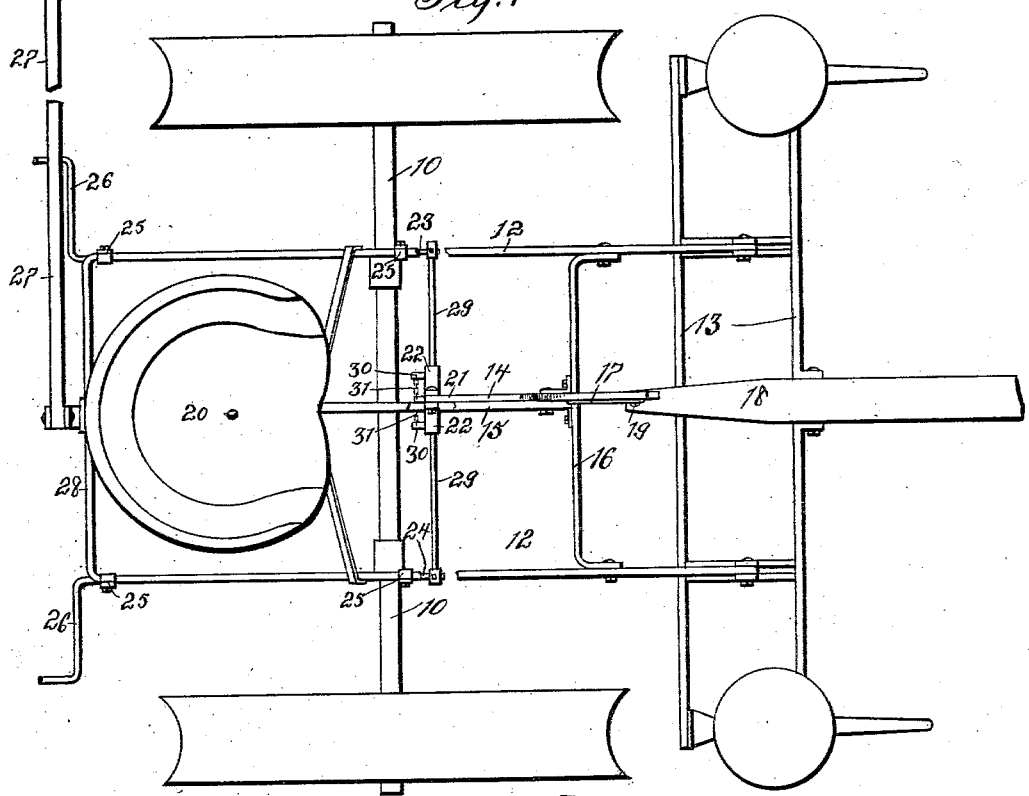
Figure 2:
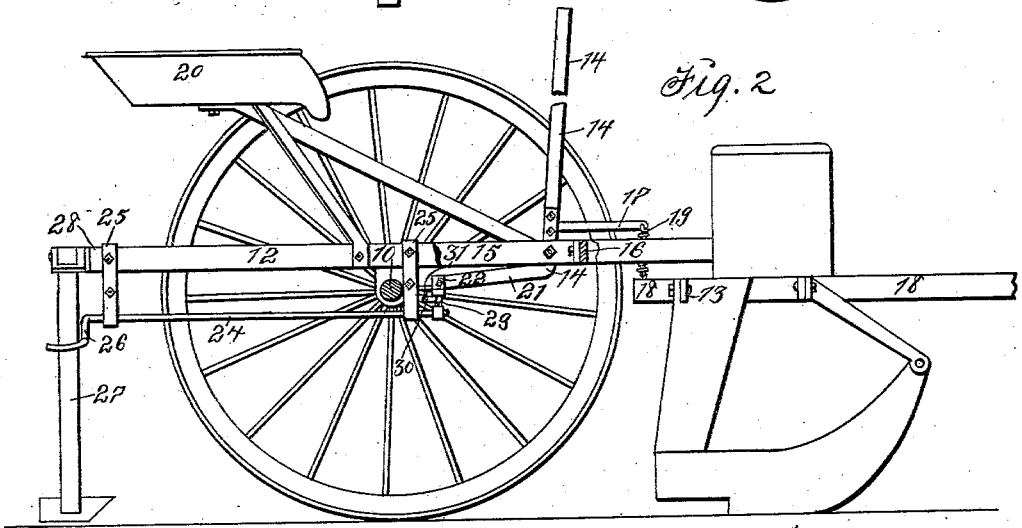

Figure 1 is a top view of a planter and shows the position of our attachments relative to the driver's seat and the mechanism for lifting the runners. Fig. 2 is a side view of the planter from which one of the carriage-wheels is removed to disclose our marker-lifting attachments as combined with the carriage-frame and the mechanism for elevating and holding the runners inoperative.

The numeral 10 designates the carriage-axle, and 12 the carriage-frame, preferably made of metal, and 13 is the runner-frame adjustably connected with frame 12, as shown or in any suitable way, in such a manner that the runner-frame and runners can be lifted and carried inoperative.

An elbow-shaped lever 14 is fulcrumed to the center bar 15 and across piece 16 of the carriage-frame and has an arm 17, that extends forward and is adjustably connected with the rear end of the pole 18 by means of a coil-spring 19, as required for lifting the runners by pulling the lever rearward by hand by a person seated on the driver's seat 20. The lever 14 also has an arm 21 at its lower end, extending rearward, and a cross-head 22 at its rear end, that serves as a treadle upon which a driver on the seat can place his feet and by foot-pressure lift and retain elevated the runners, as required in turning about at the end of a field.

Our attachments consist of two rock-shafts 23 and 24, journaled in bearers 25, fixed to the parallel-bars of the carriage-frame 12 and provided with elbow-shaped arms 26 at their rear ends adapted to engage the marker-bar 27, pivoted to the center of the cross-bar 28 at the rear end of the frame 12 in such a manner that rocking the shafts will elevate the marker. To actuate the rock-shafts, they are provided with arms 29 at their front ends, that extend under the cross-head 22 on the end of the lever 14 in such a manner that whenever the lever is operated to lift the runners it will depress the arms 29 of the rock-shafts and turn up the elbow-shaped arms 26, as required to lift the marker-bar 27 at the same time that the runners are lifted. The arms are adjustably connected with the rock-shafts and may be straight or curved. The arms 29 have elbows 30 at their ends projected rearward and that are connected by a chain 31 or in any suitable way that will allow them to be jointly depressed, as required to rock the shafts 23 and 24, and thereby lift the marker-bar.

In a practical use of our invention the pulling back of the lever 14 by hand or depressing its arm 21 by foot-pressure will lift the runners and also at the same time lift the pivoted and reversible marker-bar 27, that will be engaged by one of the arms 26 of the rock-shafts 23 and 24, so that the driver can remain on his seat in turning about at the end of field and after he has turned the planter about for a return trip he can then relax the lifting force he has applied and reverse the position of the marker-bar.

Having thus set forth the purpose of our invention and its construction, application, and operation, the utility thereof will be readily understood by farmers and others familiar with the art to which it pertains, and

What we claim as new, and desire to secure by Letters Patent, is—

1. Attachments for corn-planters consisting of two rock-shafts having elbow-shaped arms at their rear ends projecting outward and adapted to engage a marker-bar and arms at their front ends extended inward, mounted in parallel position on the opposite sides of a driver's seat and a treadle in a plane above the inner ends of said arms for actuating the rock-shafts in the manner set forth for the purposes stated.

2. In a corn-planter, two rock-shafts having arms at their rear ends adapted to engage a marker-bar and arms at their front ends extended inward and provided with elbows at their inner ends in combination with a marker-bar pivotally connected with the rear and center of the carriage-frame a lever fulcrumed to the carriage-frame having an arm extending forward and connected with the runner-frame and an arm extending rearward and having a cross-head treadle at its end adapted to engage the ends of the arms at the front ends of the rock-shafts, arranged and combined to operate in the manner set forth for the purposes stated.

3. In a corn-planter, two rock-shafts having arms at their rear ends adapted to engage a marker-bar and arms at their front ends extended inward in combination with a marker-bar pivotally connected with the rear and center of the carriage-frame, a lever fulcrumed to the carriage-frame having an arm extending forward and connected with the runner-frame and an arm extending rearward and having a cross-head treadle at its end adapted to engage the ends of the arms at the front ends of the rock-shafts, and a driver's seat located between the parallel rock-shafts in a plane above the carriage-frame and rock-shafts, arranged and combined to operate in the manner set forth for the purposes stated.

ELI E. HARTER.
E. O. DOAK.

Witnesses:
LAMONT LEE,
A. DE GARMO.